United States Patent [19]

Hester et al.

[11] Patent Number: 5,690,724

[45] Date of Patent: Nov. 25, 1997

[54] PROCESS AND COMPOSITION FOR SLIP CASTING A CERAMIC POWDER

[75] Inventors: Virgil R. Hester, Delavan; Kurtis C. Kelley, Washington; Michael C. Long, Peoria, all of Ill.

[73] Assignee: Caterpillar Inc., Peoria, Ill.

[21] Appl. No.: 717,673

[22] Filed: Sep. 23, 1996

Related U.S. Application Data

[62] Division of Ser. No. 536,762, Sep. 29, 1995.

[51] Int. Cl.⁶ ............................ C08L 1/28; C04B 35/00
[52] U.S. Cl. ............................ 106/198.1; 501/104; 501/1
[58] Field of Search ............................ 106/198.1; 501/1, 501/104

[56] References Cited

U.S. PATENT DOCUMENTS 2,316,745  4/1943  Robertson et al. ............... 106/198.1
2,322,179  6/1943  Van Zwet et al. ............... 106/198.1
5,102,836  4/1992  Brown et al. ............... 501/104
5,538,681  7/1996  Wu ............... 264/432

OTHER PUBLICATIONS

CA 83:83963, Hagiwara et al, "Porcelain coating for inorganic molded products", Dec. 12,1974.

*Primary Examiner*—David Brunsman
*Attorney, Agent, or Firm*—Pankaj M. Khosla

[57] ABSTRACT

A process and composition are disclosed for slip casting a ceramic powder in a porous mold. In this invention, a ceramic powder is blended with a polymeric cellulose ether. A slurry of ceramic powder-cellulose ether is formed. A porous mold is coated with a hydrophilic colloid of ammonium alginate to form a treated mold. The slurry is then poured in the treated mold and a slip is formed. This invention is particularly useful for forming crack-free slips made from difficult to cast ceramic powders.

6 Claims, No Drawings

PROCESS AND COMPOSITION FOR SLIP CASTING A CERAMIC POWDER

This is a divisional application of application Ser. No. 08/536,762, filed Sep. 29, 1995.

TECHNICAL FIELD

The present invention relates to a ceramic slip composition for slip casting a ceramic powder in a porous mold and more particularly, to a ceramic slip composition having a ceramic powder blended with a polymeric binder, in conjunction with a specially coated porous mold, for making crack-free slips from difficult to cast ceramic powders.

BACKGROUND ART

Slip casting of ceramic powder slurries in porous molds is well known and practiced for the production of sintered ceramic parts. Generally, the unsintered slip cast ceramic part has poor green strength and poor handling strength. Further the unsintered part tends to crack during drying in the porous mold.

The use of binders to impart green strength to the slip cast part has been known but is not widely practiced. Binders are not commonly used because they tend to detrimentally slow down the casting rate, stick to the porous mold and clog the mold. This problem is particularly exasperating when one is trying to slip cast ceramic powders that inherently do not slip cast well, either due to the powder not being suspendable in liquid, or due to a tendency of the powder particles to pack poorly, or due to too little shrinkage of the slip.

Amorphous ceramic powders, such as calcium magnesium zirconium phosphate (CMZP), for example, are particularly difficult to slip cast. However, CMZP, among other similar ceramics, is an amorphous ceramic powder that, when sintered, has an exceptionally low coefficient of thermal expansion and particularly high thermal shock resistance, and is thus of potentially great value as a material for making thermal barrier components in an engine. Hence there is considerable interest in being able to slip cast such ceramic materials.

It is desirable to have a binder mixed with a ceramic powder to impart high green strength to the resultant slip, eliminate cracking of the slip during drying in the mold, and advantageously result in adequate shrinkage of the slip to facilitate easy separation from the mold. It is simultaneously desirable that the slip does not stick to the porous mold or clog the mold. It is also desirable that the porous mold be treated with a coating to impart selective permeability of the ceramic-binder slurry liquid component without permeation of the binder component. It is further desirable that the binder be an environmentally friendly water-soluble system, rather than an organic solvent-based system.

The present invention is directed to overcome one or more of the problems as set forth above.

DISCLOSURE OF THE INVENTION

In one aspect of the invention, a process is disclosed for slip casting a ceramic powder in a porous mold. In this process, a ceramic powder is blended with a polymeric cellulose ether having a general formula:

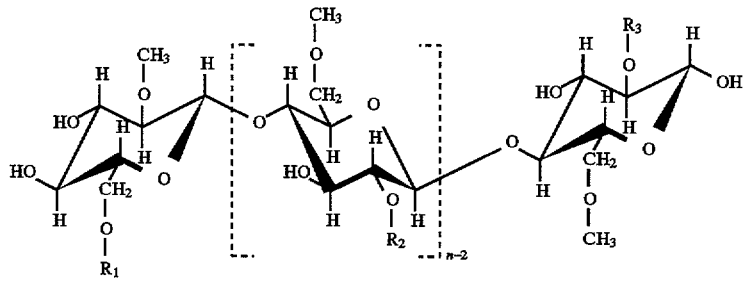

wherein $R_1$ is selected from the group consisting of $CH_3$ and $CH_2CH(OH)CH_3$; $R_2$ is selected from the group consisting of $CH_3$ and $CH_2CH(OCH_3)CH_3$; and $R_1$ is selected from a group consisting of H and $CH_3$. The value of n in the general formula is at least 100. A slurry of ceramic powder-cellulose ether is formed. A porous mold is coated with a hydrophilic colloid of ammonium alginate to form a treated mold. The slurry is then poured in the treated mold and a slip is formed.

In another aspect of this invention, a ceramic slip composition is disclosed. The ceramic slip composition comprises a ceramic powder, water, and a polymeric cellulose ether having a general formula:

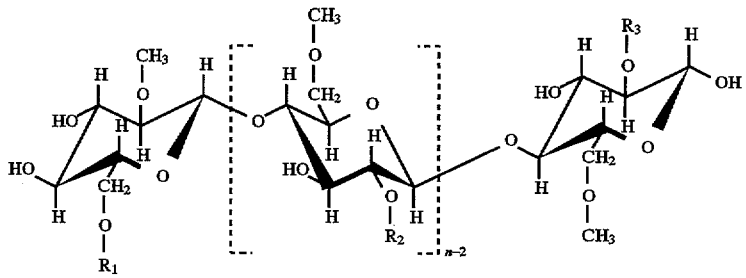

wherein $R_1$ is selected from the group consisting of $CH_3$ and $CH_2CH(OH)CH_3$; $R_2$ is selected from the group consisting of $CH_3$ and $CH_2CH(OCH_3)CH_3$; $R_3$ is selected from a group consisting of H and $CH_3$; and the value of n is at least 100. from a group consisting of H and $CH_3$; and the value of n is at least 100.

BEST MODE FOR CARRYING OUT THE INVENTION

In the preferred embodiment of the present invention, a process for slip casting a ceramic powder in a porous mold comprises the following steps. A ceramic powder, preferably calcium magnesium zirconium phosphate (CMZP), is blended with polymeric methyl cellulose ether binder having the general formula:

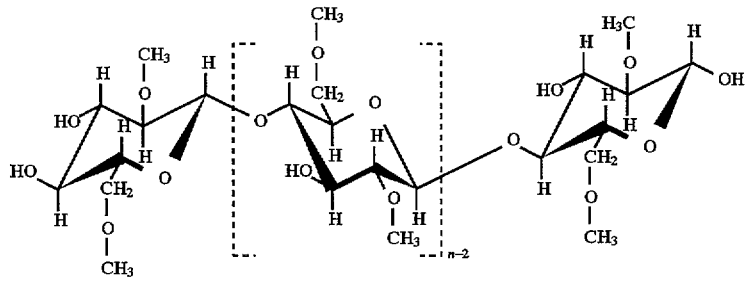

The value of n is desirably at least 100, preferably in the range of about 2000 to about 8000, and even more preferably, about 5200. A value less than 100 is undesirable because the molecular weight of the binder component is too low, detrimentally resulting in too low a viscosity of the ceramic-binder-water slurry, thus causing the ceramic powder particles in the slurry to drop out of the suspension. Preferably, the value of n is greater than about 2000, otherwise the molecular weight of the binder is too low, and the resultant viscosity of the ceramic-binder-water slurry is also too low, consequently the rate of slip formation in the porous mold is too rapid, resulting in a loss of green strength in the slip. If the value of n is greater than 8000, the viscosity of the ceramic-binder-water slurry is too high, and the rate of slip formation in the porous mold is too slow, representing a waste of time and labor.

Alternatively, a ceramic powder, such as CMZP, may be blended with polymeric hydroxypropyl methylcellulose ether having a general formula;

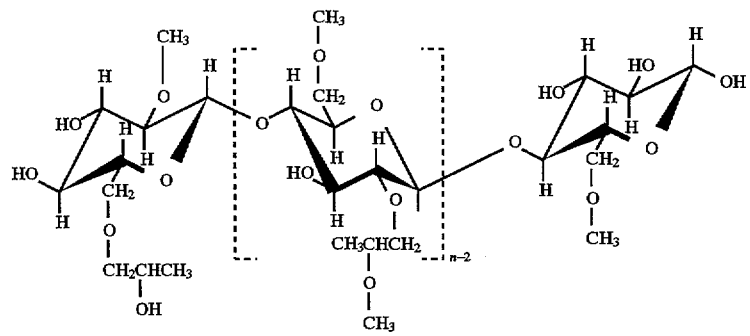

or other cellulose ether compounds having a polymer backbone of cellulose which are water soluble and are capable of thermal gellation. Such cellulose ether compounds are ones made by the treatment of cellulose fibers with a caustic solution treated with methyl chloride, and/or propylene oxide.

In the preferred embodiment of the present invention, a ceramic-binder slurry is formed by the addition of water to the ceramic powder-polymeric cellulose ether mixture. Desirably, the water has a temperature of at least about 70° C. and preferably, about 100° C. A temperature of at least 70° C. is necessary for the ceramic powder-methyl cellulose ether mixture to adequately form a homogeneous suspension in water and form a slurry.

In the preferred embodiment of the present invention, the slurry is stirred until the temperature of the slurry is less than about 40° C. This is done ensure adequate agitation time during the cooling of the slurry from about 70° C. to about 40° C. If stirring is stopped before the slurry cools to about In the preferred embodiment, during the step of stirring, the pH value of the slurry is desirably maintained in the range of about 2 to about 7, and preferably at about 4. If the pH is less than about 2 or greater than about 7, the dispersion will detrimentally settle.

In the preferred embodiment of this invention, the ceramic powder and polymeric cellulose ether are blended in a weight ratio, desirably in the range of about 100:0.25 to about 100:1.25, and preferably in a weight ratio of about 100:0.75, ceramic:cellulose ether respectively. A ratio less than 100:0.25 is undesirable because the polymeric cellulose ether will not impart enough green strength and handling strength to the resultant slip upon the gellation of the polymeric cellulose ether, i.e., the binder component of the slurry. A ratio greater than 100:1.25 is undesirable because the binder component will cause the viscosity of the slurry to be too high, and thus detrimentally slow down the slip formation in the porous mold and also detrimentally increase the porosity of the final sintered slip part.

In the preferred embodiment of this invention, the blend of ceramic powder and polymeric cellulose ether is mixed with water, desirably in a weight ratio in the range of about 0.90:1 to about 1:0.9, and preferably about 1:1, blend:water respectively. If this ratio is less than 0.9:1, the viscosity of the resultant slurry will be too low. If this ratio is more than 1:0.9, the viscosity of the resultant slurry will be too high. The viscosity of the slurry is maintained desirably in the range of about 1000 centipoise (cP) to about 5000 cP, and preferably about 3000 cP. If the viscosity of the slurry is too high, it will detrimentally slow down the slip formation in the porous mold.

In the preferred embodiment of the present invention, a porous mold is coated with a hydrophilic colloid of ammonium alginate. The hydrophilic colloid of ammonium alginate is in solution with water and the hydrophilic colloid is present, desirably in the range of about 0.05% to about 2.0% by weight of the water, and preferably about 0.2% by weight of the water. An amount less than about 0.05% by weight is undesirable because the amount of coating deposited on the porous mold surface will be insufficient to impart the selective permeability characteristics to the mold. An amount more than about 2.0% by weight is undesirable because the amount of coating deposited on the porous mold surface will be too excessive and will cause the mold pores to detrimentally clog.

In the preferred embodiment, the porous mold is filled with the colloid coating-water solution and after a period of about 15 seconds has elapsed, the mold is emptied. The mold is then dried for at least about 5 minutes. Drying time of at least 5 minutes is desirable to form a "skin" of the colloid coating.

In the preferred embodiment of the present invention, the slip slurry is poured into the mold in an amount and for a time sufficient to achieve a desired part thickness. Such amount and time can be determined by one skilled in the art of slip casting, based on the desired part thickness, without undue experimentation. The slip is desirably dried at a temperature of at least 50° C. for about 4 hours. Preferably, the slip is dried for another 10 hours at about 100° C. A drying temperature less than 50° C. and a drying time less than 4 hours are undesirable because the slip will not develop enough handling strength and will crack.

It has been discovered that the colloid coating makes the porous mold surface selectively permeating in that when a slip slurry comprising ceramic-polymeric cellulose ether-water is poured into the colloid coated mold, there is a unique osmotic chemistry that causes the water component of the slurry to permeate out of the mold preferentially, as compared to the polymeric ether binder component of the slurry, which does not permeate. In fact, it is discovered that the colloid coating forms a thin "skin" on the inner surface of the porous mold. When the resultant slip is formed and dried, the "skin" facilitates the slip to separate very easily from the porous mold surface, without cracking or spalling. Furthermore, the thin "skin" itself separates from the mold and the slip, and can be discarded. As a result, the mold pores do not become clogged with the binder and the mold can be re-used, thereby considerably increasing mold life.

EXAMPLE A

In the below described illustrative Example A, the ceramic powder used was calcium magnesium zirconium phosphate (CMZP). The polymeric cellulose ether used was hydroxypropyl methylcellulose ether, manufactured by Dow Chemical Co., having a trade name "METHOCEL 20-231" and a thermal gellation temperature of about 40° C. at a 2.5% weight concentration in water. The hydrophilic colloid of ammonium alginate used was manufactured by Kelco, a division of Merck & Co., Inc, having a trade name "SUPERLOID" and "AMOLOID HV", and a solution viscosity in the range of 700 to 1700 cP at 1.0% by weight solution in water.

A ceramic slip part was made by the process embodying the present invention, in the following manner:

A slip slurry was formed by blending CMZP, "METHOCEL 20-231" and water in the following composition;

| | |
|---|---|
| CMZP | 100 gms |
| METHOCEL 20-231 | 0.75 gms |
| Water | 100 gms |

CMZP was dry blended with Methocel and then water was added at a temperature of 100° C. and continuously stirred. The pH value was kept at about 4. Stirring was continued till the slurry cooled down to 40° C.

A plaster mold was treated with a 0.2% solution of SUPERLOID by pouring the solution in the mold, and 15 seconds thereafter, emptying the mold. The mold was dried for 15 minutes.

The slip slurry was poured in the mold and the slip was dried for 8 hours at 50° C. and another 8 hours at 100° C.

The dried slip was then removed from the mold and sintered as per the following firing schedule: heat to about 304° C. at a rate of 2° C./minute and hold for 30 minutes; further heat to about 430° C. at a rate of 2° C. per minute and hold for 30 minutes; further heat to about 1000° C. at a rate of 5° C. per minute and hold for 4 hours; further heat to about 1200° C. at a rate of 5° C. per minute and hold for 24 hours; and then allow to cool in oven.

Industrial Applicability

The present invention is particularly useful in making crack-free slips from difficult to cast slip ceramic powders such as amorphous ceramic powders like CMZP, for example, by exploiting the synergistic osmotic chemistry between the polymeric binder component of the ceramic slurry and the hydrophilic colloid coating of the porous mold to result in slips having superior green strength and molds being clog-free and having a longer useful life.

This invention is applicable in the manufacture of ceramic exhaust port/manifold liners in engine applications.

Other aspects, features and advantages of the present invention can be attained from a study of this disclosure together with the appended claims.

We claim:

1. A ceramic slip composition, comprising:

a ceramic powder;

a polymeric cellulose ether having a general formula;

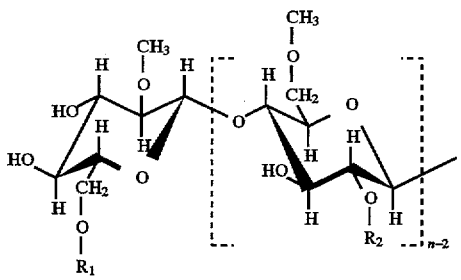

-continued

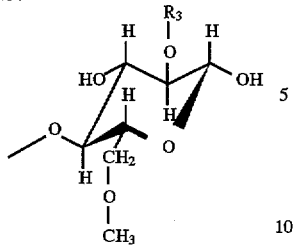

wherein $R_1$ is selected from the group consisting of $CH_3$ and $CH_2CH(OH)CH_3$; $R_2$ is selected from the group consisting of $CH_3$ and $CH_3CH(OCH_3)CH_3$; $R_3$ is selected from a group consisting of H and $CH_3$; and the value of n is at least 100;

water;

said ceramic powder and said polymeric cellulose ether being present in a weight ratio in the range of about 100:0.25 to about 100:1.25 ceramic powder:polymeric cellulose ether;

said blend of ceramic powder and polymeric cellulose ether being present in said water in a weight ratio of about 0.9:1.0 to about 1.0:0.9 blend:water; and said ceramic slip composition having a viscosity in the range of about 1000 cP to about 5000 cP.

2. A ceramic slip composition, as set forth in claim 1, wherein said ceramic powder is calcium magnesium zirconium phosphate.

3. A ceramic slip composition, as set forth in claim 1, wherein $R_1$ is $CH_3$; $R_2$ is $CH_3$; and $R_3$ is $CH_3$.

4. A ceramic slip composition, as set forth in claim 1, wherein $R_1$ is $CH_2CH(OH)CH_3$; $R_2$ is $CH_2CH(OCH_3)CH_3$; and $R_3$ is H.

5. A ceramic slip composition, as set forth in claim 1, wherein the value of n is in the range of from about 2000 to about 8000.

6. A ceramic slip composition, as set forth in claim 1, wherein said blend of ceramic powder and polymeric cellulose ether is mixed with water in a weight ratio of about 1:1.

* * * * *